United States Patent
Dubrovsky et al.

(10) Patent No.: US 12,328,585 B2
(45) Date of Patent: Jun. 10, 2025

(54) TRUST MANAGEMENT IN DISTRIBUTED SYSTEMS

(71) Applicant: Dell Products L.P., Round Rock, TX (US)

(72) Inventors: Igor Dubrovsky, Beer-Sheva (IL); Nisan Haimov, Beer-Sheva (IL); Maxim Balin, Gan-Yavne (IL); Boris Shpilyuck, Ashdod (IL)

(73) Assignee: Dell Products L.P., Round Rock, TX (US)

( * ) Notice: Subject to any disclaimer, the term of this patent is extended or adjusted under 35 U.S.C. 154(b) by 228 days.

(21) Appl. No.: 18/359,494

(22) Filed: Jul. 26, 2023

(65) Prior Publication Data

US 2025/0039674 A1    Jan. 30, 2025

(51) Int. Cl.
*H04W 12/60* (2021.01)

(52) U.S. Cl.
CPC .................... *H04W 12/66* (2021.01)

(58) Field of Classification Search
CPC .................................................... H04W 12/66
See application file for complete search history.

(56) References Cited

U.S. PATENT DOCUMENTS

| | | | |
|---|---|---|---|
| 11,734,656 B1* | 8/2023 | Kalaboukis | G06Q 20/401 705/77 |
| 2012/0192251 A1* | 7/2012 | Faiman | H04L 63/105 726/3 |
| 2017/0155659 A1* | 6/2017 | Baltar | H04L 63/105 |
| 2020/0013062 A1* | 1/2020 | Pratt | H04L 63/102 |
| 2022/0385696 A1* | 12/2022 | Jiang | H04L 63/20 |

* cited by examiner

*Primary Examiner* — Baotran N To
(74) *Attorney, Agent, or Firm* — WOMBLE BOND DICKINSON (US) LLP

(57) ABSTRACT

Methods and systems for managing trust in distributed are disclosed. To manage trust, a behavior and characteristic based trust model may be used. The trust model may utilize similarity between devices and public activity of devices over time to ascertain levels of trust that should be afforded devices of the distributed system. The levels of trust may be used to ascertain whether requests from devices of the distributed systems should be honored, or rejected. The trust models may facilitate establishment of trust in environments where physical intrusion based threats are present.

20 Claims, 5 Drawing Sheets

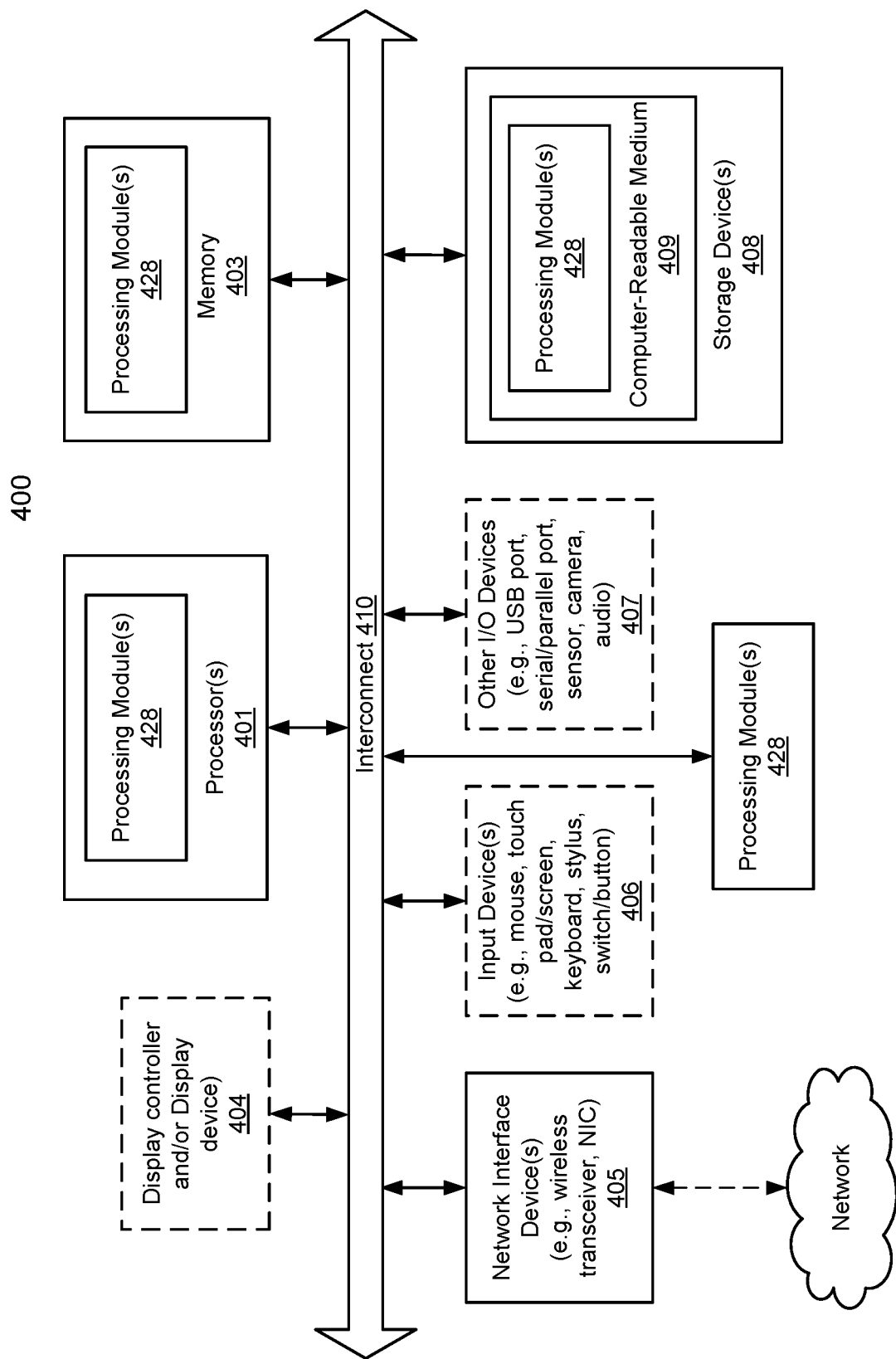

TRUST MANAGEMENT IN DISTRIBUTED SYSTEMS

FIELD

Embodiments disclosed herein relate generally to trust management. More particularly, embodiments disclosed herein relate to systems and methods to manage trust in distributed systems.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIG. 4 shows a block diagram illustrating a data processing system in accordance with an embodiment.

DETAILED DESCRIPTION

Figure 1:
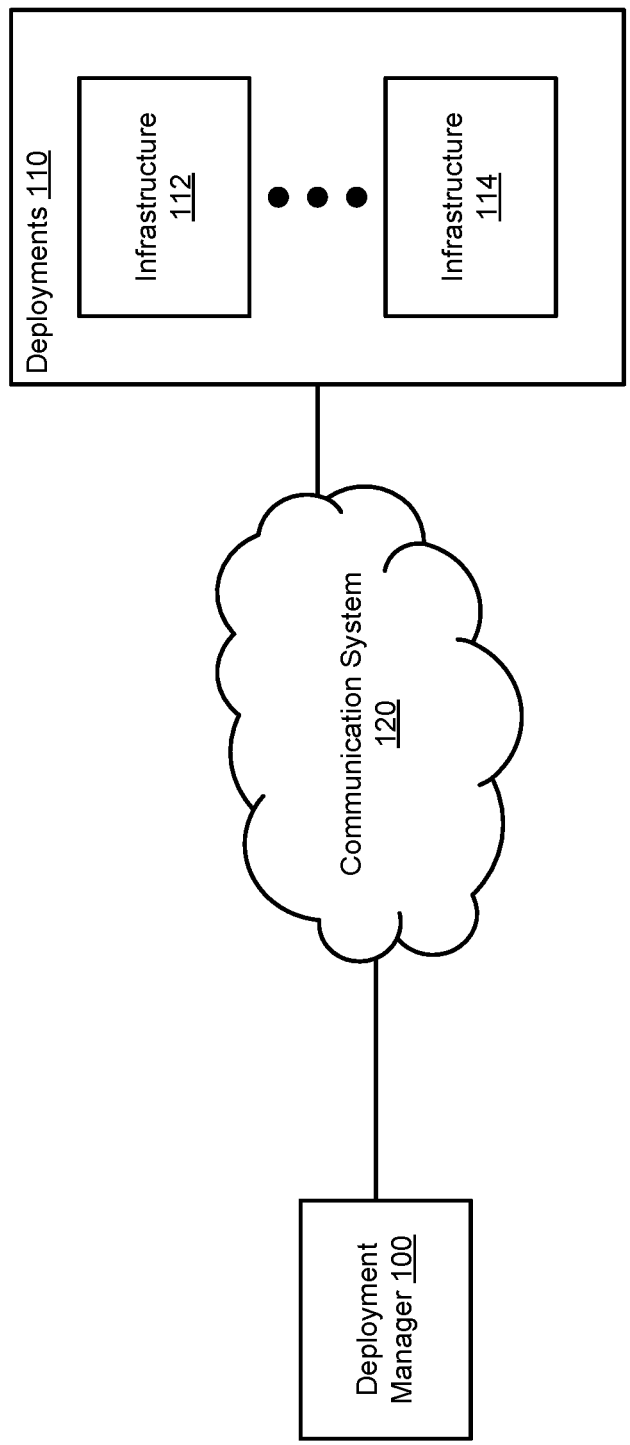
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing trust in distributed systems. To manage trust in distributed system, a trust model that takes into account the behavioral consistency of devices and similarity between devices may be used to quantify levels of trust (e.g., a trust rating) between devices of the distributed system.

The trust ratings may be established by quantifying the behavior consistency of a device, and calculating various levels of direct and indirect trust between two devices. The direct trust between two devices may be based on similarity of characteristics of the device such as location, security posture, role, software loadout, configuration, etc. The direct trust may also take into account the behavioral consistency of the devices.

The indirect trust between two devices may be based on the degree of trust that a neighboring devices has in one of the devices. The direct trust between a first device of the two devices and a second device of the two devices may be scaled based on the direct trust between a neighboring device and the second device of the two devices to obtain an indirect trust rating of the second device with respect to the first device.

These direct trust, indirect trust, and behavior consistency ratings for a given device (e.g., with respect to another device) may be used to obtain an overall trust rating of the given device. The trust rating for the given device may be used to decide the extent of trust in the given device.

For example, different types of requests may require different levels of trust in the requestor for the requests to be honored. The trust rating for the requestor may be compared to a corresponding threshold for the types of the requests to determine whether to honor each of the requests.

Once obtained, the trust ratings may be distributed to member devices of the distributed system. Each of the devices may use the trust ratings to independently evaluate whether to honor requests received from other devices.

By doing so, embodiments disclosed herein may reduce the impact of compromised, malfunctioning, and/or otherwise impaired devices of a distribute system. For example, the trust ratings may exclude devices exhibiting anomalous or compromised behavior from participating the distributed system. Consequently, undesirable activity of devices may automatically be effectively quarantined.

Accordingly, embodiments disclosed herein may provide a system that addresses, among others, the technical problem of undesired activity in distributed systems. By implementing a trust model, as discussed above, the system may automatically isolate undesired activity that may not be otherwise identifiable through analysis of devices. For example, physical intrusion and modification of devices may present little signatures for identification purposes. In contrast, through automatic, behavior and characteristic based analysis of devices, the disclosed trust model may address undesired behavior that may otherwise go undetected.

In an embodiment, a method for managing operation of a distributed system is provided. The method may include obtaining, by a first data processing system of the distributed system, a request from a second data processing system of the distributed system; obtaining a trust rating for the second data processing system, the trust rating being based on at least one rating selected from a group of rating consisting of a direct trust rating of the second data processing system with respect to the first data processing system, an indirect trust rating of the second data processing system with respect to the first data processing system, and a behavioral consistency rating with respect to the second data processing system; making a determination regarding whether the request is acceptable based on the trust rating; in a first instance of the determination where the request is acceptable: processing the request; and in a second instance of the determination where the request is not acceptable: rejecting the request.

The direct trust rating may be based on a similarity between a first context for the first data processing system and a second context for the second data processing system.

The first context may be based at least in part on a location of the first data processing system, a service provided by the first data processing system, and a security posture of the first data processing system.

The indirect trust rating may be based on the direct trust rating and another direct trust rating for the second data processing system with respect to a neighboring data processing system of the distributed system.

The neighboring data processing system may be a neighbor of the first data processing system.

The behavioral consistency rating may be based at least in part on a time history of activity of the second data processing system.

The behavioral consistency rating may quantify consistency of actions from the time history that performed by the second data processing system in response to occurrences of a same event.

The trust rating may be a weighted sum of the direct trust rating, the indirect trust rating, and the behavior consistency rating.

Making the determination may include comparing the weighted sum to a criteria.

The criteria may be a threshold.

The threshold may be based at least in part on an average trust rating for data processing systems of the distributed system.

Processing the request may include performing at least one action on behavior of the second data processing system, the at least one action being restricted for performance for entities lacking trust ratings that meet one or more criteria.

In an embodiment, a non-transitory computer readable media (e.g., a machine readable medium) is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services. The computer implemented services may include any type and quantity of computer implemented services. For example, the computer implemented services may include data storage services, instant messaging services, database services, and/or any other type of service that may be implemented with a computing device.

To provide the computer implemented services, the system of FIG. 1 may include deployments 110. A deployment may include collections of various infrastructure 112, 114. Infrastructure (e.g., 112-114) may include any number of data processing systems (e.g., servers, edge devices, internet of things devices, etc.) that may provide all or a portion of the computer implemented services (e.g., cooperatively and/or independently). Different infrastructure and deployments may provide similar or different computer implemented services.

Different components of deployment 110 may include different capabilities. For example, edge devices of deployments 110 may include fewer capabilities than backend servers or other devices in high density computing environments. Additionally, these various components may themselves be located in different environments that present different types of risks to the components.

For example, backend servers in high density computing environments may generally be secure against physical attacks. In contrast, edge devices may be positioned in remote locations (e.g., retail shopping centers) where physical security is minimal at best. Consequently, such devices may face threats that are more difficult to identify and manage.

For example, edge devices may suffer from physical attacks through which malicious parties may compromise the edge devices. Such attacks and resulting compromises of devices may be challenging to identify due to the minimal signatures of presented by devices compromised through physical attack.

For example, if a malicious entity is able to access cabling bundles between hardware components of an edge system, the malicious entity may be able to implement a man in the middle attack that may not present any significant signature of the attack from the perspective of the edge device and/or devices operably connected to the compromised edge device.

In general, embodiments disclosed herein may provide methods, systems, and/or devices for managing threats to components of distributed systems. The manage the threats, the system may implement a trust model that does not rely on explicit identification of compromised systems. Rather, the trust model may determine the trustworthiness of other devices based on (i) consistency of behavior of the other devices over time, and (ii) similarity to the other devices. By establishing trust between devices based at least in part on these factors, the impact of compromised devices in the distributed system may be reduced.

When trust in another devices meets a criteria (e.g., minimum level), then the ability of the other device to interact with other devices and invoke functionalities of other devices may be limited. Such devices may be at least partially isolated from the rest of the distributed system thereby containing potential impacts of compromise of the devices.

By doing so, compromises of devices in distributed systems may have a reduced impact on operation of the system.

To provide the above noted functionality, the system of FIG. 1 may include deployment manager 100, deployments 110, and communication system 120. Each of these components is discussed below.

Figure 2A:
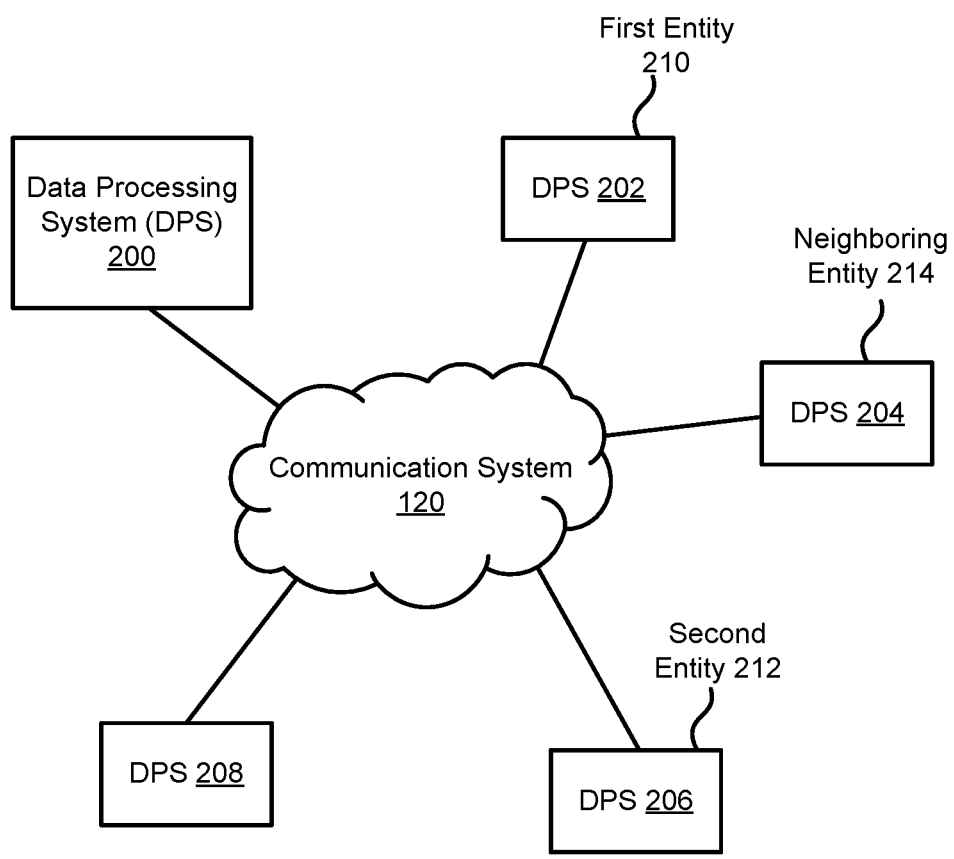
FIG. 2A shows a block diagram illustrating an example edge deployment in accordance with an embodiment.
Figure 2B:
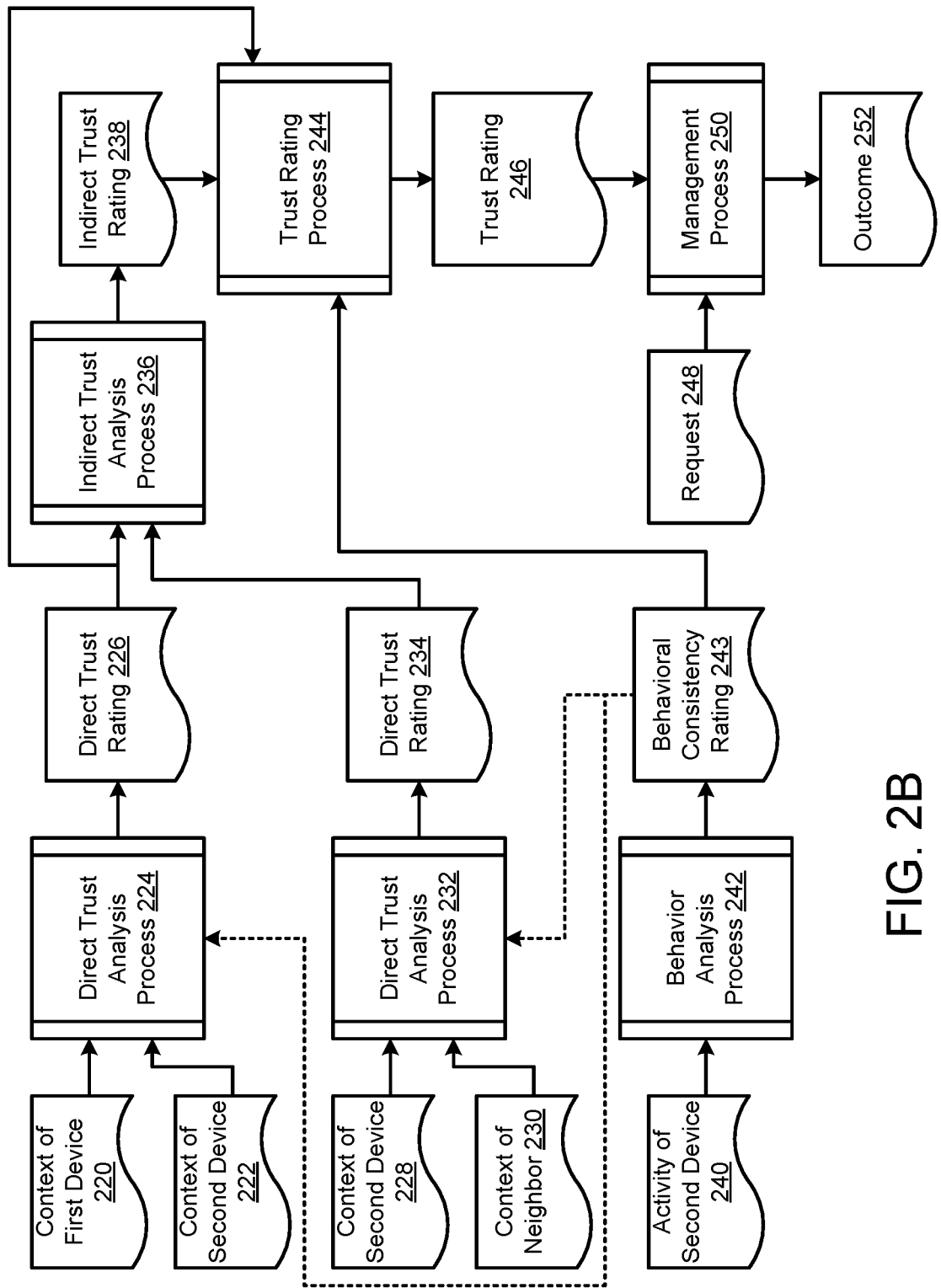
FIG. 2B shows a diagram illustrating a data flow in accordance with an embodiment.

Deployment manager 100 may manage trust between components of deployments 110. To manage trust, deployment manager 100 may (i) monitor activity of the components over time, (ii) quantify the consistency of the activity to obtain behavior consistency ratings for the components, (iii) monitor characteristics of the components over time, (iv) quantify the similarity between the characteristics of the components over time to obtain direct and indirect trust ratings, and (v) using the direct trust ratings, the indirect trust ratings, and behavior consistency ratings to obtain trust ratings for the components. The trust ratings for the components may be distributed and used by the components of deployments 110 to determine whether to trust other components. Refer to FIGS. 2A-2B for additional details regarding trust in the distributed system.

Deployments 110 may include any number of collections of infrastructure 112-114. The infrastructure may provide various computer implemented services. Different infrastructure may include different types and/or numbers of data processing systems. The data processing systems may be implemented using, for example, edge devices. Such edge devices may be positioned in environments rendering them susceptible to various types of threat that are not present to data processing systems in other types of environments.

To manage the threats, the data processing systems may be (i) monitor their activity and characteristics, (ii) report their activity and characteristics to deployment manager 100, (iii) obtain trust ratings (e.g., for other data processing systems) from deployment manager 100, and (iv) use the trust rating to determine whether to trust other data processing systems. For example, the trust ratings for other data processing systems may be compared to criteria. The comparisons may be used to ascertain whether to trust the other devices. If the other devices are trusted, then a data processing system may honor requests from the other devices, may provide data to the other devices, etc. If the other devices are not trusted, then the data processing systems may reject requests from the other devices. Refer to FIG. 2A for additional details regarding trusting other devices in distributed systems, and FIG. 2B for additional details regarding obtaining trust ratings for other data processing systems.

While illustrated as being separate from deployments 110, the functionality of deployment manager 100 may be performed by any of the components of deployments 110. For example, deployment manager 100 may be implemented using a distributed management framework. The management framework may perform the functionality of deployment manager 100, discussed herein.

Figure 3:
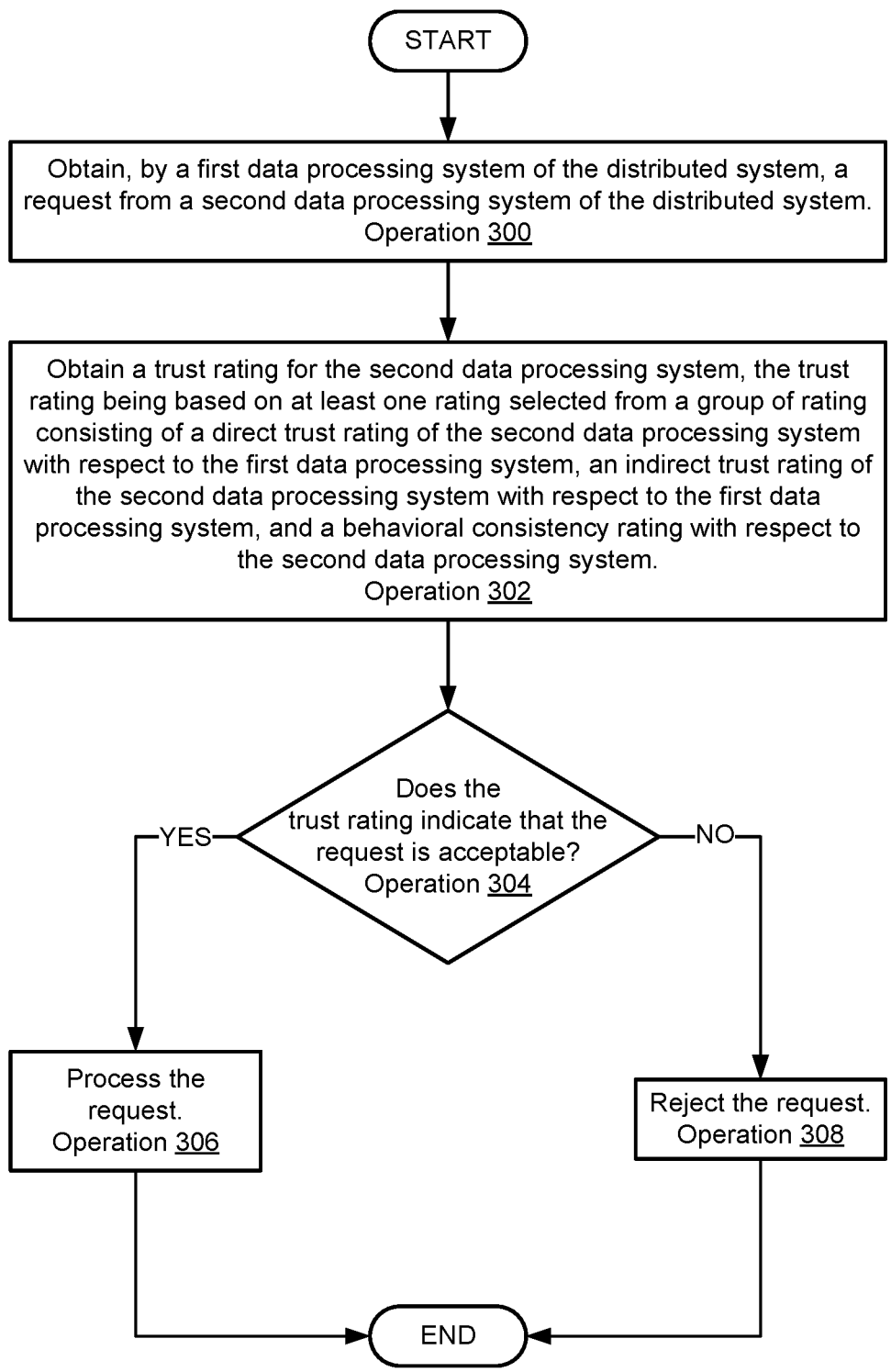
FIG. 3 shows a flow diagram illustrating a method in accordance with an embodiment.

When providing their functionality, any of deployment manager 100 and deployments 110 may perform all, or a portion, of the methods illustrated in FIG. 3.

Any of deployment manager 100 and deployments 110 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node (e.g., an edge device/system), and/or any other type of data processing device or system. For additional details regarding computing devices, refer to FIG. 4.

Any of the components illustrated in FIG. 1 may be operably connected to each other (and/or components not illustrated) with communication system 120. In an embodiment, communication system 120 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

As discussed above, deployments of the system of FIG. 1 may include any number of data processing systems (DPSs) that may operate as edge devices. Such devices may be more vulnerable to a range of threats.

Turning to FIG. 2A, a diagram of an example arrangement of data processing systems operating as edge systems in accordance with an embodiment is shown. In FIG. 2A, the data processing systems (DPSs) may provide various services and may be operably connected to one another via communication system 120. However, DPSs 200-208 may be located in an environment that renders them subject to physical threats. For example, DPSs 200-208 may be located near a retail store location, in a warehouse, a factory, a multifamily residential housing unit, and/or other locations where physical security of DPSs 200-208 is low. Consequently, any of DPSs 200-208 may be subject to physical threats, in additional to cybersecurity related threats from being in operable communications with other systems via communication systems 120.

To manage trust in the deployment, DPSs 200-208 may implement the trust model, discussed above. To implement the trust model, DPSs 200-208 may use trust ratings for the other DPSs to decide whether to trust the other DPSs.

As discussed above, the trust ratings for a given DPS may be based on direct trust ratings, indirect trust ratings, and behavioral consistency ratings. For example, first entity 210 (e.g., DPS 202) may obtain a request from second entity 212 (e.g., 206).

To ascertain whether to accept the request, first entity 210 may ascertain the direct trust for second entity 212, the indirect trust in second entity 212, and the behavioral consistency ratings for second entity 212. The direct trust rating may be based on the similarity between the contexts of the two entities. The context for each entity may reflect the environment where each entity is located, the network environment of each entity, the security posture of each entity, the software components of each entity, the configurations of each entity, the hardware components of each entity, and/or other characteristics of each of the entities. The similarity may be quantified by calculating a Jaccard similarity between the two sets of characteristics.

In contrast, the indirect trust rating may reflect a scaled rating of the direct trust rating modified by a second direct trust rating. For example, the direct trust rating ascribed by first entity 210 may be scaled by a direct trust rating for second entity 212 by neighboring entity 214. For example, if the direct trust rating of second entity 212 with respect to first entity 210 is 0.9 (e.g., scaled from 0 to 1), and the direct trust rating of second entity 212 with respect to neighboring entity 214 is 0.8, then the indirect trust rating of second entity 212 with respect to first entity 210 may be 0.72 (e.g., 0.9 multiplied by 0.8). Neighboring entity 214 may be an entity that is similar to first entity 210 (e.g., in total or with respect to a subset of the characteristics).

In contrast to both the direct and indirect trust rating, the behavior consistency score for second entity 212 may only be based on consistency of the second entity's behavior over time. The behavior consistency score may be a quantification based on how frequently second entity 212 performs the same action in response to occurrences of similar events. To obtain the behavior consistency score, the activity of and events impacting second entity 212 may be monitored over time to identify response by second entity 212 to the events. An average response for each event may be identified, and different response from the average response may be treated as inconsistent activity while the instances of the average response may be treated as consistent activity. The behavior consistency score may be the number of instances of consistent activity divided by the total number of instance of activities (consistent and inconsistent).

The activities may be, for example, the manner in which second entity 212 interacts with other entities and the events may be the interactions. Thus, the behavior consistency rating may reflect public activity of second entity 212 (as opposed to internal or private activity).

Once these ratings for second entity 212 are obtained, an overall rating may be obtained using these three (and/or other) ratings. For example, a weighted sum of the ratings may be obtained. The weightings may be set, for example, by a subject matter expert, by a user, may be automatically selected based on weights historically used over time, and/or via other processes. The resulting rating may be a quantification.

Turning to FIG. 2B, a data flow diagram illustrating data flows, data processing, and/or other operations that may be performed by the system of FIG. 1 in accordance with an embodiment is shown. The data flow diagram may illustrate data flows that may occur while requests for performance of activity by data processing systems are evaluated. In FIG. 2B, a first set of shapes (e.g., 220, 222) is used to represent data structures, and a second set of shapes (e.g., 224, 232) is used to represent processes performed using data.

To evaluate when a request (e.g., 248) should be honored, a trust rating (e.g., 246) for the requesting devices with respect to a recipient of the request may be used. The rating may be using during performance of management process 250. During management process 250, the trust rating for the requestor may be compared to criteria (e.g., thresholds). The criteria may vary depending on the type of request. For example, some requests may require a higher degree of trust in the requestor for the request to be honored, while other types of request may require lesser degrees of trust. The outcome (e.g., 252) of the comparison may indicate whether the requestor is sufficiently trustworthy for request 248 to be honored.

If honored, the request may be processed (by performing requested actions). If not honored, the request may be rejected (by not performing it).

The trust rating (e.g., 246) for the requestor may be based on direct trust rating 226, indirect trust rating 238, and behavioral consistency rating 243.

Direct trust rating 226 may be obtained via direct trust analysis process 224. During direct trust analysis process 224, context of a recipient device (e.g., 220) and context of a requesting device (e.g., 222) may be ingested and used to quantify the similarity of the requesting and recipient devices. The similarity may be quantified using Jaccard similarity coefficient, which may be a scaled (e.g., from 0 to 1) quantification of the similarity of the two contexts. Other similarity quantifications (e.g., simple matching coefficients, market basket analysis, Tanimoto similarity, overlap coefficients, hamming distances, Tversky index, Sørensen-Dice coefficient, etc.).

The direct trust may also take into account the behavior consistency ratings. For example, the behavioral consistency rating may be a weighted sum of the similarity and behavioral consistency score.

Thus, the resulting direct trust rating 226 may take into account both similarity between the requestor and recipient, as well as the behavioral consistency rating of the requestor. In FIG. 2B, the line between behavioral consistency rating 243 and direct trust analysis process 224 is drawn in dashing to indicate that direct trust analysis process 224 may or may not take into account behavioral consistency rating 243.

To obtain indirect trust rating 238, indirect trust analysis process 236 may be performed. During indirect trust analysis process 236, the direct trust rating 226 of the requestor with respect to the recipient may be scaled based on direct trust rating 234. For example, the two direct trust ratings may be multiplied to obtain indirect trust rating 238.

In contrast to direct trust rating 226, direct trust rating 234 may be a direct trust rating of the requestor with respect to a neighboring entity for the recipient. In other words, the level of trust in the requestor that a neighboring entity (e.g., with respect to the recipient) has in the requestor may be taken into account.

Direct trust rating 234 may be obtained via direct trust analysis process 232. Direct trust analysis process 232 may be similar to direct trust analysis process 232. However, the ingested contexts (e.g., 228, 230) may be those of the requestor and the neighboring entity, rather than the requestor and the recipient (e.g., of the request). Thus, direct trust rating 234 may reflect the neighboring entity's perception of trust in the requestor.

The neighboring entity may be a device that is similar to the recipient, as opposed to being similar to the requestor. The neighbor may be similar in location, and/or other characteristics (or a subset of the contexts of the two devices).

Behavioral consistency rating 243 may be obtained via behavioral analysis process 242. During behavioral analysis process 242, activity of the requestor (e.g., 240) may be ingested and analyzed for consistency, as discussed with respect to FIG. 2B. The analysis may yield a quantification for the consistency of the requestor's behavior, and on which behavioral consistency rating 243 may be based.

Once the separate ratings are obtained, trust rating process 244 may be performed. During trust rating process 244, the three ratings may be used (e.g., averaged, weighted averaged, etc.) to obtain trust rating 246.

Trust rating 246 may be obtained dynamically obtained and updated over time. Copies of trust ratings for any number of devices may be distributed across a distributed system. Accordingly, the entities of the distributed system may independently evaluate requests from other devices over time.

As discussed above, the components of FIG. 1 may perform various methods to manage operation of a distributed system through evaluating trust in components of the distributed system. FIG. 3 illustrates a method that may be performed by the components of the system of FIG. 1. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method for managing requests in accordance with an embodiment is shown. The method may be performed by any of deployment manager 100, deployments 110, and/or other components of the system shown in FIG. 1.

At operation 300, a request is obtained by a first data processing system. The request may be from a second data processing system. Both data processing systems may be part of a deployment, such as an edge deployment.

The request may be obtained by receiving it via a communication from the second data processing system.

At operation 302, a trust rating for the second data processing system is obtained. The trust rating may be obtained by reading it from storage, receiving it from another device, and/or generating the trust rating. The trust rating may be based on at least one of a direct trust rating for the second data processing system with respect to the first data processing system, and indirect trust rating of the second data processing system with respect to the first data processing system, and a behavioral consistency rating for the second data processing system.

At operation 304, a determination is made regarding whether the trust rating indicates that the request is acceptable. The determination may be made by comparing the trust rating to a criteria. The criteria may be a threshold that defines a minimum trust rating that is acceptable. The criteria may be based on a type of the request. Different types of request may have different minimum expectations regarding trust in a requestor for a request to be performed. For example, different types of requests may implicate different levels of activity and impact on the first data processing system. Requests to provide copies of data may require lower levels of trust, while requests to delete data, modify security settings, and/or take other actions that may modify and/or imperil future operation of the first data processing system may require higher levels of trust for the request to be honored.

In some cases, multiple types of criteria may apply to a particular request. For example, a request may require performance of different types of activities which may each present different levels of threats to the first data processing system. In scenarios in which multiple types of criteria apply, the criteria may be resolved by, for example, averaging the criteria, using a highest bar specified by the different criteria, by enhancing the highest bar based on the numbers and types of criteria, and/or via other type of resolution processes to obtain a single or otherwise controlling criteria.

If the trust rating for the second data processing system meets the minimum trust rating that is acceptable, then the request may be acceptable for performance by the first data processing system.

If the request is acceptable, then the method may proceed to operation 306 following operation 304. Otherwise, the method may proceed to operation 308.

At operation 306, the request is processed. The request may be processed by performing actions specified by the request. The actions may include, for example, providing data to the second data processing system, modifying a configuration of the first data processing system, and/or other actions.

The method may end following operation 306.

Returning to operation 304, the method may proceed to operation 308 following operation 304 when the request is not acceptable.

At operation 308, the request is rejected. The request may be rejected by refusing to perform actions specified by the request.

When a request is rejected, a basis for the rejection may be provided to the second data processing system. For example, the trust rating and criteria may be provided. Additionally, the three different trust ratings used to obtain the overall trust rating may be provided. An automation engine of the second data processing system may attempt to use the aforementioned information to improve trust between the first data processing system and the second data processing system.

The method may end following operation 308.

Thus, using the method shown in FIG. 3, a system in accordance with an embodiment may automatically elect to process or reject requests from various devices within the system. The decision to process or reject the requests may be based on trust ratings between the devices. The basis for the trust ratings may exclude devices exhibiting anomalous activity from invoking the functionalities of other devices.

Any of the components illustrated in FIGS. 1-2B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of a distributed system, the method comprising:
    obtaining, by a first data processing system of the distributed system, a request from a second data processing system of the distributed system;
    obtaining a trust rating for the second data processing system, the trust rating being based on at least one rating selected from a group of rating consisting of a direct trust rating of the second data processing system with respect to the first data processing system, an indirect trust rating of the second data processing system with respect to the first data processing system, and a behavioral consistency rating with respect to the second data processing system;
    making a determination regarding whether the request is acceptable based on the trust rating;
    in a first instance of the determination where the request is acceptable:
        processing the request; and
    in a second instance of the determination where the request is not acceptable:
        rejecting the request.

2. The method of claim 1, wherein the direct trust rating is based on a similarity between a first context for the first data processing system and a second context for the second data processing system.

3. The method of claim 2, wherein the first context is based at least in part on a location of the first data processing system, a service provided by the first data processing system, and a security posture of the first data processing system.

4. The method of claim 2, wherein the indirect trust rating is based on the direct trust rating and another direct trust rating for the second data processing system with respect to a neighboring data processing system of the distributed system.

5. The method of claim 4, wherein the neighboring data processing system is a neighbor of the first data processing system.

6. The method of claim 4, wherein the behavioral consistency rating is based at least in part on a time history of activity of the second data processing system.

7. The method of claim 6, wherein the behavioral consistency rating quantifies consistency of actions from the time history that performed by the second data processing system in response to occurrences of a same event.

8. The method of claim 6, wherein the trust rating is a weighted sum of the direct trust rating, the indirect trust rating, and the behavior consistency rating.

9. The method of claim 8, wherein making the determination comprises comparing the weighted sum to a criteria.

10. The method of claim 9, wherein the criteria is a threshold.

11. The method of claim 10, wherein the threshold is based at least in part on an average trust rating for data processing systems of the distributed system.

12. The method of claim 1, wherein processing the request comprises performing at least one action on behavior of the second data processing system, the at least one action being restricted for performance for entities lacking trust ratings that meet one or more criteria.

13. A non-transitory machine-readable medium having instructions stored therein, which when executed by a processor, cause operations for managing a distributed system, the operations comprising:
    obtaining, by a first data processing system of the distributed system, a request from a second data processing system of the distributed system;
    obtaining a trust rating for the second data processing system, the trust rating being based on at least one rating selected from a group of rating consisting of a direct trust rating of the second data processing system with respect to the first data processing system, an indirect trust rating of the second data processing system with respect to the first data processing system, and a behavioral consistency rating with respect to the second data processing system;
    making a determination regarding whether the request is acceptable based on the trust rating;
    in a first instance of the determination where the request is acceptable:
        processing the request; and
    in a second instance of the determination where the request is not acceptable:
        rejecting the request.

14. The non-transitory machine-readable medium of claim 13, wherein the direct trust rating is based on a similarity between a first context for the first data processing system and a second context for the second data processing system.

15. The non-transitory machine-readable medium of claim 14, wherein the first context is based at least in part on a location of the first data processing system, a service provided by the first data processing system, and a security posture of the first data processing system.

16. The non-transitory machine-readable medium of claim 14, wherein the indirect trust rating is based on the direct trust rating and another direct trust rating for the second data processing system with respect to a neighboring data processing system of the distributed system.

17. A management system, comprising:
a processor; and
a memory coupled to the processor to store instructions, which when executed by the processor, cause operations for managing resources of a distributed system to be performed, the operations comprising:
obtaining, by a first data processing system of the distributed system, a request from a second data processing system of the distributed system;
obtaining a trust rating for the second data processing system, the trust rating being based on at least one rating selected from a group of rating consisting of a direct trust rating of the second data processing system with respect to the first data processing system, an indirect trust rating of the second data processing system with respect to the first data processing system, and a behavioral consistency rating with respect to the second data processing system;
making a determination regarding whether the request is acceptable based on the trust rating;
in a first instance of the determination where the request is acceptable:
processing the request; and
in a second instance of the determination where the request is not acceptable:
rejecting the request.

18. The management system of claim 17, wherein the direct trust rating is based on a similarity between a first context for the first data processing system and a second context for the second data processing system.

19. The management system of claim 18, wherein the first context is based at least in part on a location of the first data processing system, a service provided by the first data processing system, and a security posture of the first data processing system.

20. The management system of claim 18, wherein the indirect trust rating is based on the direct trust rating and another direct trust rating for the second data processing system with respect to a neighboring data processing system of the distributed system.

* * * * *